(12) United States Patent
Bajko et al.

(10) Patent No.: US 12,212,963 B2
(45) Date of Patent: *Jan. 28, 2025

(54) METHODS AND DEVICES FOR MULTI-LINK DEVICE (MLD) ADDRESS DISCOVERY IN A WIRELESS NETWORK

(71) Applicant: MediaTek Singapore Pte. Ltd., Singapore (SG)

(72) Inventors: Gabor Bajko, San Jose, CA (US); Yongho Seok, San Jose, CA (US); James Chih-Shi Yee, San Jose, CA (US); Kai Ying Lu, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,001

(22) Filed: Jul. 6, 2023

(65) Prior Publication Data
US 2023/0354022 A1    Nov. 2, 2023

Related U.S. Application Data

(63) Continuation of application No. 17/243,305, filed on Apr. 28, 2021, now Pat. No. 11,722,894.

(60) Provisional application No. 63/021,709, filed on May 8, 2020.

(51) Int. Cl.
| | | |
|---|---|---|
| *H04M 1/66* | (2006.01) |
| *H04W 8/00* | (2009.01) |
| *H04W 8/26* | (2009.01) |
| *H04W 12/06* | (2021.01) |
| *H04W 12/106* | (2021.01) |
| *H04W 12/71* | (2021.01) |
| *H04W 48/16* | (2009.01) |

(52) U.S. Cl.
CPC ........... *H04W 12/06* (2013.01); *H04W 8/005* (2013.01); *H04W 8/26* (2013.01); *H04W 12/106* (2021.01); *H04W 12/71* (2021.01); *H04W 48/16* (2013.01)

(58) Field of Classification Search
CPC ... H04W 12/06; H04W 12/106; H04W 12/71; H04W 8/005; H04W 8/26; H04W 48/16
USPC ...................................................... 455/411
See application file for complete search history.

(56) References Cited

U.S. PATENT DOCUMENTS

| | | |
|---|---|---|
| 9,179,495 B1 | 11/2015 | Scherzer et al. |
| 2013/0095789 A1 | 4/2013 | Keevill et al. |
| 2019/0335454 A1 | 10/2019 | Huang et al. |
| 2020/0162907 A1 | 5/2020 | Dhammawat et al. |
| 2021/0067961 A1 | 3/2021 | Dhammawat et al. |

FOREIGN PATENT DOCUMENTS

| | | |
|---|---|---|
| CN | 111066271 A | 4/2020 |
| KR | 20060048208 A | 5/2006 |
| WO | 2020040589 A1 | 2/2020 |

*Primary Examiner* — Temica M Beamer

(57) ABSTRACT

Embodiments of the present invention provide methods and devices for discovering a multi-link device (MLD) on a wireless network. One exemplary approach includes transmitting a beacon frame including a MAC address of an AP MLD on the wireless network. The AP MLD includes a plurality of STAs operating on a plurality of wireless links and associated with a plurality of wireless MAC addresses. A password element is generated using a preconfigured password and the MAC address of the AP MLD, and authentication is performed using the password element.

20 Claims, 9 Drawing Sheets

METHODS AND DEVICES FOR MULTI-LINK DEVICE (MLD) ADDRESS DISCOVERY IN A WIRELESS NETWORK

CROSS-REFERENCE TO RELATED APPLICATIONS

This application claims the benefit of and priority to copending U.S. patent application Ser. No. 17/243,305, with filing date Apr. 28, 2021, and to provisional patent application Ser. No. 63/021,709, with filing date May 8, 2020, which are hereby incorporated by reference in their entirety.

FIELD

Embodiments of the present invention generally relate to the field of wireless communications. More specifically, embodiments of the present invention relate to systems and methods for address discovery in a wireless communication network.

BACKGROUND

Modern electronic devices typically send and receive data with other electronic devices wirelessly using Wi-Fi, and many of these devices are "dual band" or multi-link devices (MLD) that include at least two wireless transceivers capable of operating in different frequency bands, e.g., 2.4 GHz, 5 GHz, and 6 GHz. In most cases, a wireless device will communicate over only a single band at a time. For example, older and low-power devices, e.g., battery powered devices, often operate on the 2.4 GHz band. Newer devices and devices that require greater bandwidth often operate on the 5 GHz band. The availability of the 6 GHz band is a recent advancement and can provide higher performance, lower latency, and faster data rates.

In some cases, the use of a single band may not satisfy the bandwidth needs of certain devices. Therefore, some developing approaches to wireless communication increase communication bandwidth by operating on multiple bands concurrently (technically called link aggregation or multi-link operation). Multi-link operations can provide higher network throughput and improved network flexibility compared to traditional techniques for wireless communication.

In most cases a non-access point (AP) multi-link device (MLD) will not enable all links at a given time to conserve power unless traffic requirements are relatively high. A non-AP MLD may operate on different channels depending on channel conditions, such as traffic, channel capabilities, bandwidth, etc, and may switch between the channels as necessary. An MLD can monitor the different links and perform basic operations, such as traffic indication and BSS parameter updates. However, existing approaches to network address discovery for wireless networks are unable to uniquely identify multi-link devices or perform link setup over multiple wireless links simultaneously.

SUMMARY

What is needed is an approach to address discovery for multi-link devices that can be used to identify wireless access points for performing authentication and association between devices, and that is capable of being used to setup multiple wireless links at the same time. Accordingly, embodiments of the present invention are drawn to electronic systems in a wireless communication network capable of transmitting or receiving beacon frames and probe response frames that include medium access control (MAC) addresses of an MLD operating on multiple links. The beacon frames and probe response frames can include an MLD MAC address that uniquely identifies an AP MLD in a wireless network, and can optionally include one or more wireless medium (WM) MAC addresses of wireless stations (STAs) of the AP MLD. The MAC addresses can be used by wireless devices (e.g., STA MLDs) to connect to and associate with the AP MLD, and to generate a password element used during authentication between wireless devices.

According to one embodiment, a method of discovering a multi-link device (MLD) on a wireless network is disclosed. The method includes transmitting a beacon frame including a MAC address of an AP MLD on the wireless network. The AP MLD includes a plurality of STAs operating on a plurality of wireless links and associated with a plurality of wireless MAC addresses. The method further includes generating a password element using a preconfigured password and the MAC address of the AP MLD, and performing authentication using the password element.

According to some embodiments, the AP MLD includes a first transceiver operating on a first wireless link and a second transceiver operating on a second wireless link. The transmitting a beacon frame for receipt by a wireless station STA MLD is performed over the first wireless link, and the performing authentication between the AP MLD and the STA MLD is performed over the second wireless link.

According to some embodiments, the method includes associating the AP MLD and an STA MLD according to the authentication.

According to some embodiments, the beacon frame includes message integrity check (MIC) integrity protection, and the method further includes associating the AP MLD with the MAC addresses of the AP MLD, and subsequent to the associating, transmitting a key used to generate the MIC integrity protection for receipt by an STA MLD.

According to some embodiments, the AP MLD includes a plurality of transceivers operating on a plurality of wireless links, and the method further includes transmitting a plurality of beacon frames including the MAC address of the AP MLD over the plurality of wireless links.

According to some embodiments, the MAC address of the AP MLD is an MLD MAC address of the AP MLD that identifies the AP MLD in the wireless network.

According to some embodiments, the beacon frame includes a plurality of MAC addresses of the plurality of STAs of the AP MLD.

According to some embodiments, the method further includes receiving a commit message, and the generating a password element is performed responsive to the commit message.

According to another embodiment, a method of authenticating a multi-link device (MLD) on a wireless network at an access point (AP) MLD is disclosed. The method includes generating a password element using a MAC address of an AP MLD, where the AP MLD includes a plurality of STAs operating on a plurality of wireless links, and performing authentication using the password element. The AP MLD includes a first transceiver operating on a first wireless link and a second transceiver operating on a second wireless link, and the performing authentication is performed over the second wireless link.

According to some embodiments, the method includes associating the AP MLD with an STA MLD according to the authentication.

According to some embodiments, the performing authentication includes an STA MLD transmitting a commit message of an authentication sequence and/or the AP MLD transmitting a confirm message of the authentication sequence.

According to some embodiments, the MAC address of the AP MLD is an MLD MAC address that uniquely identifies the AP MLD in the wireless network.

A wireless access point (AP) multi-link device (MLD) including a first transceiver operating on a first wireless link, a second transceiver operating on a second wireless link, a memory for storing data, and a processor operable to cause the first transceiver to transmit a beacon frame for receipt by a wireless station (STA) MLD, where the beacon frame includes a MAC address of the wireless AP MLD on the wireless network, generate a password element using a preconfigured password using the MAC address of the wireless AP MLD, and perform authentication using the password element.

According to some embodiments, the processor is further operable to cause the first transceiver to transmit the beacon frame for receipt by the wireless STA MLD over the first wireless link.

According to some embodiments, the processor is further operable to perform authentication over the second wireless link.

According to some embodiments, the processor is further operable to associate the wireless STA MLD with the AP MLD according to the authentication.

According to some embodiments, the beacon frame includes message integrity check (MIC) integrity protection, and where the processor is further operable to:
associate the wireless AP MLD with the MAC addresses of the wireless AP MLD, and subsequent to the associate, transmit a key used to generate the MIC integrity protection to the STA MLD.

According to some embodiments, the processor is further operable to cause the second transceiver to transmit another beacon frame including the MAC address of the wireless AP MLD over the second wireless link.

According to some embodiments, the MAC address of the wireless AP MLD is an MLD MAC address of the wireless AP MLD that identifies the wireless AP MLD in the wireless network.

According to some embodiments, the wireless AP MLD includes additional STAs operating on additional wireless links, and where the beacon frame includes additional MAC addresses for the additional STAs of the wireless AP MLD.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
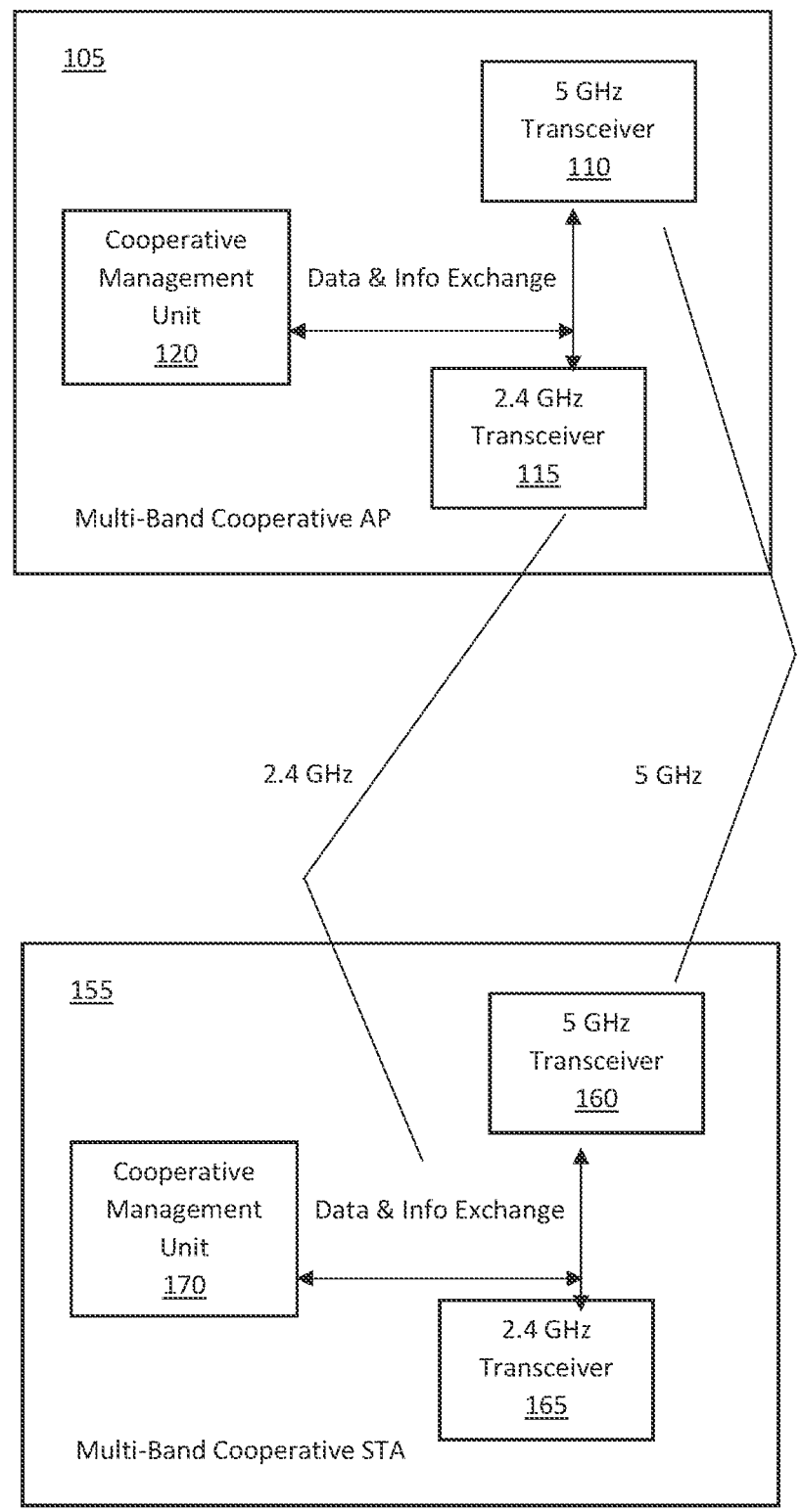
FIG. 1 is a block diagram of an exemplary wireless communication system including a multi-link cooperative AP and a multi-link cooperative STA according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 6-8) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic announces capable of being stored, transferred, combined, compared, and otherwise manipulated in a computer system. It has proven convenient at times, principally for reasons of common usage, to refer to these announces as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "setting," "storing," "transmitting," "retransmitting," "authenticating," "identifying," "requesting," "reporting," "determining," or the like, refer to the action and processes of a computer system, or similar electronic processors, computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Novel Techniques for Multi-Link Device (MLD) Address Discovery in a Wireless Network As used herein, the term "EHT" refers generally to a recent generation of wireless communication (Wi-Fi) known as Extremely High Throughput (EHT) and is defined according to the IEEE 802.11be standards. The term station (STA) refers generally to an electronic device capable of sending and receiving data over Wi-Fi that is not operating as an access point (AP). A multi-link device (MLD) such as an AP MLD or a non-AP MLD can include several wireless stations for communicating over different wireless links and/or for performing multi-link operations.

With regard to FIG. 1, an exemplary wireless communication system 100 including a multi-link cooperative AP 105 and a multi-link cooperative STA 155 is depicted according to embodiments of the present invention. The multi-link cooperative AP 105 includes a 5 GHz transceiver 110 and a 2.4 GHz transceiver 115. The transceivers 110 and 115 of AP 105 exchange data and information with cooperative management unit 120 that coordinates information sent and/or received by transceivers 110 and 115.

Multi-link cooperative ST 155 includes a 5 GHz transceiver 160 and a 2.4 GHz transceiver 165. Other types of transceivers that operate on different bands, such as 6 GHz and above, can also be used by the multi-link cooperative STA 155 according to some embodiments of the present invention. Cooperative management unit 170 coordinates information sent and received by transceivers 160 and 165 using 5 GHz band wireless communication and 2.4 GHz band wireless communication, respectively, although any well-known wireless communication band (e.g., 6 GHz) can be used. STA 155 transmitting frames using multiple bands simultaneously can mitigate delay and improve peak throughput of STA 155.

Figure 2:
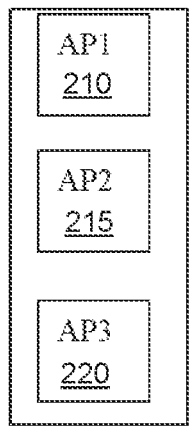
FIG. 2 is a block diagram of an exemplary wireless network including multi-link devices having three affiliated wireless STAs according to embodiments of the present invention.
Figure 2:
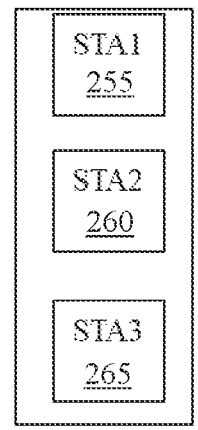

With regard to FIG. 2, an exemplary wireless network 200 including multi-link devices 205 and 250 each having three affiliated wireless STAs is depicted according to embodiments of the present invention. MLD 205 is configured as an AP MLD and includes affiliated AP STAs AP1 (210), AP2 (215), and AP3 (220). Each affiliated AP STA is configured to communicate over a different wireless link (e.g., 2.4 GHz, 5 GHz, or 6 GHz) of a wireless network. MLD 250 is configured as a non-AP STA MLD and includes affiliated non-AP STAs STA1 (255), STA2 (260), and STA3 (265). Each affiliated STA is configured to communicate over a different wireless link (e.g., 2.4 GHz, 5 GHz, or 6 GHz). In the example of FIG. 1, AP1 and STA1 communicate over Link 1 (230), AP2 and STA2 communicate over Link 2 (235), and AP3 and STA3 communicate over Link 3 (240). AP MLD 205 and non-AP STA MLD 250 can perform multi-link operations using the available wireless links. Each STA and AP are associated with a unique MAC address in the wireless network. Further, AP MLD 205 and non-AP STA MLD 250 are also associated with a unique MAC address (an "MLD MAC address"). According to embodiments of the present invention, the AP MLD and non-AP STA MLD can use the MLD MAC address to transmit, route and filter packets received wirelessly from other devices.

Figure 3:
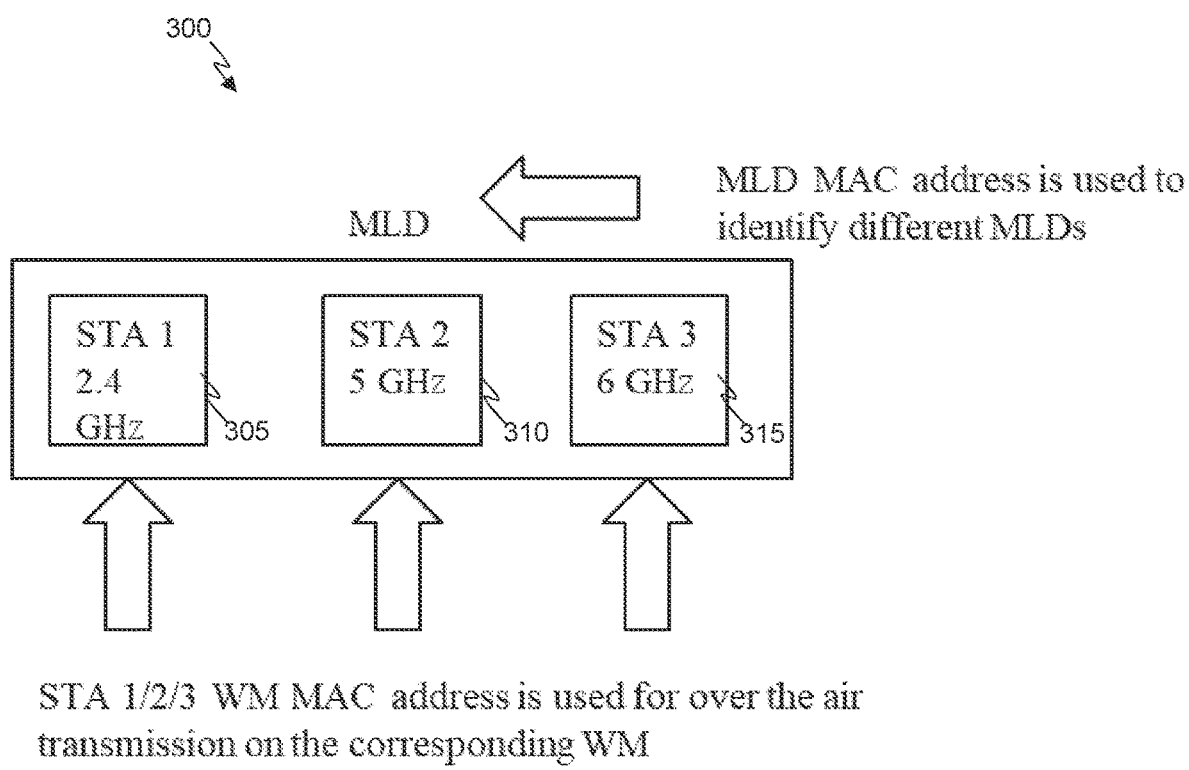
FIG. 3 is a block diagram of an exemplary non-AP STA MLD having three wireless STAs identified on corresponding wireless mediums using unique MAC addresses according to embodiments of the present invention.
Figure 4:
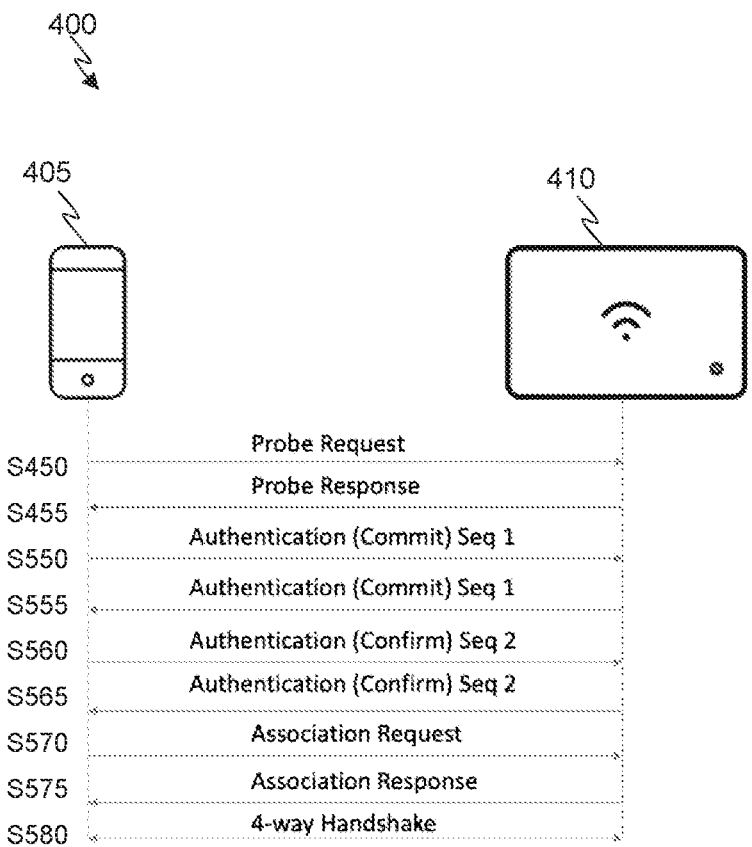
FIG. 4 is a block diagram depicting an exemplary computer implemented multi-link setup procedure performed by multi-link devices according to embodiments of the present invention.

FIG. 3 depicts an exemplary MLD 300 having three wireless STAs identified on corresponding wireless mediums using unique MAC addresses according to embodiments of the present invention. MLD 300 can be configured as a non-AP STA MLD or an AP STA MLD according to embodiments. MLD 300 is associated with a unique MLD MAC address used to identify the non-AP STA MLD among many MLDs on a wireless network. The MLD MAC address of MLD 300 can be provided during a multi-link setup procedure as depicted in FIG. 4. STA wireless medium (WM) MAC addresses are used for transmission on the corresponding wireless medium.

According to some embodiments, the MAC addresses of an AP can be discovered by a wireless STA before association. In the example of FIG. 3, MLD 300 includes STA1 (305) operating on a 2.4 GHz wireless link, STA2 (310) operating on a 5 GHz wireless link, and STA3 (315) operating on a 6 GHz wireless link. MLD 300 is associated with an MLD MAC address that uniquely identifies the MLD management entity for differentiating between different MLDs on the wireless network. The respective MAC addresses of STA1 (305), STA2 (310), and STA3 (315) are used for wireless transmission on the corresponding wireless medium.

FIG. 4 is a block diagram depicting an exemplary computer implemented process 400 performed between an STA 405 and a wireless AP 410 for performing discovery, authentication, and associated according to embodiments of the present invention. As depicted in FIG. 4, STA 405 initiates the wireless communication by transmitting a probe request frame at step S450. At step S455, AP 410 transmits a probe response frame response to the probe request frame transmitted in step S450 including MAC addresses of AP 410. Next, authentication is performed between the devices using commit and confirm messages. In step S550, authentication sequence 1 is initiated by STA 405 transmitting an authentication commit message. In step S555 AP 410 transmits an authentication commit message of authentication sequence 1. In step S560, authentication sequence 2 is initiated by STA 405 transmitting another authentication commit message. In step S565 AP 410 also transmits another authentication commit message of authentication sequence 1. During authentication sequence 1 and 2, PWE generation is performed using one or more MAC addressees (e.g., an MLD MAC address and/or WM MAC address) of STA 405 and/or AP 410.

Based on the authentication, at step S570, STA 405 can transmit an association request to AP 410, and AP 410 can accept the association request by transmitting an association response frame in step S575. After association, a 4-way handshake is performed by exchanging messages between STA 405 and AP 410 to generate encryption keys which can be used to encrypt actual data sent over the wireless medium.

Novel Process for MLD Addressing and Discovery in a Wireless Network

Figure 5:
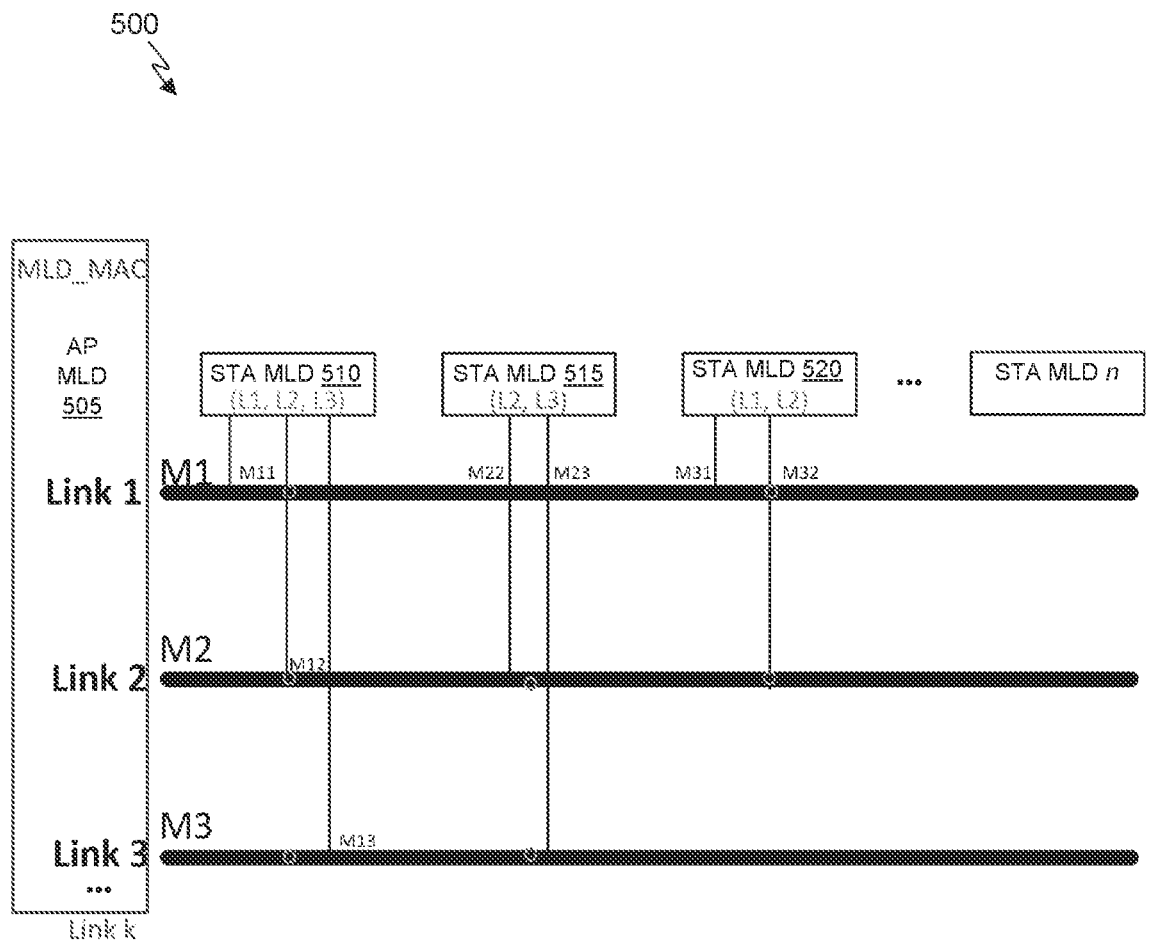
FIG. 5 is a block diagram depicting an exemplary AP MLD having a unique MLD MAC address used for address discovery over three wireless links in a wireless network according to embodiments of the present invention.

Embodiments of the present invention provide novel methods and systems for discovering and associating wireless devices with an AP MLD. In the example of FIG. 5, wireless AP MLD 505 communicates over three wireless links, and each wireless link is associated with a unique MAC address. Specifically, wireless AP MLD 505 has MAC address M1 for communicating over Link 1, MAC address M2 for communicating over Link 2, and MAC address M3 for communicating over Link 3. AP MLD 505 is also associated with its own unique MLD MAC address MLD_MAC. In the example of FIG. 5, AP MLD 505 communicates with communicates with STA MLD 510 over wireless links Link 1, Link 2, and Link 3, with STA MLD 515, over wireless links Link 2, and Link 3, and with STA MLD 520 over wireless links Link 1 and Link 2 in wireless network 500 using addressing techniques disclosed herein according to embodiments of the present invention.

STA MLD 510, 515, and 520 can communicate with AP MLD 505 to perform multi-link operations over one or more available wireless links. STA MLD 510 includes three wireless STAs that operate on wireless links Link 1, Link 2, and Link 3 (associated with MAC addresses M11, M12, and M13, respectively). STA MLD 515 and STA MLD 520 each include two wireless STAs for communicating over different wireless links and having different MAC addresses M22, M23, M31, and M32. Additional STA MLDs (e.g., STA$_n$MLD) can also be associated with AP MLD 505, and each additional STA MLD is associated with a unique MAC address, including a unique MLD MAC addresses.

For performing multi-link operations, an STA MLD first discovers an available AP MLD and performs a multi-link setup procedure to associate with the discovered AP MLD. It is appreciated that an AP MLD can setup multiple wireless links at the same time during the multi-link setup procedure. According to some embodiments, AP MLDs transmit beacon frames that include MAC addresses of the AP MLD, such as the MLD MAC address of the AP MLD (e.g., MLD_MAC of AP MLD 505). The beacon frames can be transmitted on all available wireless links of AP MLD 505 simultaneously. According to other embodiments, the beacon frames are not transmitted on all wireless links, and the beacon frames include all MAC addresses of the AP MLD (e.g., MLD_MAC, M1, M2, and M3). Similarly, an AP MLD can respond to a probe request frame transmitted by a wireless STA frame by transmitting a probe response frame that includes the MAC addresses of the AP MLD.

According to some embodiments, a wireless STA can transmit a probe request frame that is received by the AP MLD on one channel (e.g., Link 1), and the MAC addresses contained in the probe response frame broadcast by the AP MLD are used to associate with the AP MLD over a different wireless channel (e.g., Link 2 and/or Link 3). In this way, a wireless STA listening to one wireless link can discover and associate with the AP MLD over a different wireless link without having to switch channels, which advantageously improves the efficiency and performance of the wireless network. In the example of FIG. 5, a probe request frame received by AP MLD 505 over Link 1 at MAC address M1 can be used to associate with STA MLD 1 over Link 2 (M2) and Link 3 (M3), and AP MLD 505 can perform multi-link operations with STA MLD 1 over the Link 2 and Link 3 using the respective MAC addresses.

To associate with an AP MLD, a wireless STA performs authentication using a Simultaneous Authentication of Equals (SAE) authentication procedure. The wireless STA initiates the procedure when a peer is discovered using a beacon frame or a probe response frame. The PWE (password element) for performing SAE authentication can be calculated using a preconfigured password in combination with configuration information, such as a MAC address. According to some embodiments, the MLD MAC address of the STA MLD and/or the MLD MAC address of the AP MLD are used to calculate the PWE for SAE authentication in combination with a WM MAC address of the STA MLD or AP MLD.

The password seed for SAE password generation can be calculated using the formula: pwd-seed=H(MAX(MAC address 1, MAC address 2)∥MIN(MAC address 1, MAC address 2), base∥counter), where base is the preconfigured password and counter=1. The formula performs a hash function on the maximum of MAC address 1 and MAC address 2 concatenated with the minimum of MAC address 1 and MAC address 2, the preconfigured password, and the counter value (1) to generate a fixed-length string. MAC address 1 and MAC address 2 can be the MAC address of a non-AP STA and the MAC address of an AP STA, for example.

For a multi-link device, Address 1 and Address 2 can be set to the MLD MAC address of the STA and the MLD MAC address of the AP. Some embodiments of the present invention use a WM MAC of the STA MLD and the MLD MAC address of the AP MLD, or a WM MAC address of the STA MLD and a WM MAC address of the AP, for setting the MAC address 1 and MAC address 2 to calculate the PWE. For example, according to some embodiments, the password seed for SAE password generation can be calculated using the formula: pwd-seed=H(MAX(MLD_STAi, MLD_MAC)∥MIN(MLD_MAC, MLD_STAi, base∥counter), where STAi is a wireless STA of the STA MLD operating on link i, and MLD_MAC is the MLD MAC address of the AP MLD. MLD_STAi can be either the MLD MAC Address of the STA MLD or the WM MAC of the STA MLD operating on link i. When the AP's WM MAC is used, the STA MLD adds the AP's WM MAC addresses to the authenticated TA addresses that it will receive frames from for filtering purposes. According to other embodiments, the password seed for SAE password generation when performing authentication between two STAs can be calculated using the formula:

PWE=scalar-op(val,PT), with val=$H$(0$n$,MAX(STA-$A$-MAC,STA-$B$-MAC)∥MIN (STA-$A$-MAC,STA-$B$-MAC))

val=val modulo($r$−1)+1

According to some embodiments, an STA can associate with an AP MLD without verifying the message integrity check (MIC) of the beacon or probe response frame transmitted by the AP MLD. Secure binding can be performed by the AP MLD during discovery (e.g., between MLD_MAC and $M_{i,\ i=1,k}$, where $M_i$ is the MAC address of an STA operating on link i, and k is the number of available wireless links of the AP MLD), and the integrity protection is later verified by the STA after receiving a key from the AP MLD. For example, the MLD_MAC and $M_{i,\ 1=l,k}$ addresses can be carried in beacon frame or a probe response frame with MIC (integrity protection), and the STA can verify the MIC after associating with the AP MLD and receiving the key which was used by the AP MLD to generate the MIC. The STA can remain associated with the AP MLD if the MIC is verified successful; otherwise the STA walks away from the AP MLD. The AP MLD MAC address can be unique within the wireless network or unique per the STAs.

Figure 6:
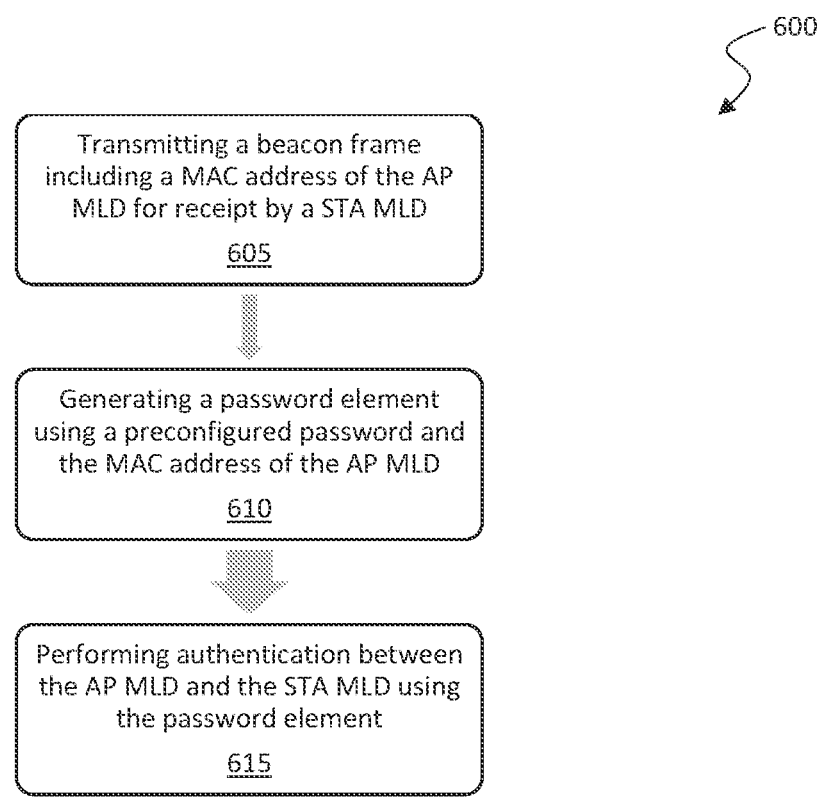
FIG. 6 is a flowchart of an exemplary computer implemented process for performing address discovery to identify and associate with an AP MLD. The AP MLD transmits beacon frames including a MAC address of the AP MLD over one or more wireless link in a wireless network according to embodiments of the present invention.

FIG. 6 is a flowchart of an exemplary computer implemented process 600 for automatically performing address discovery and password element generation to authenticate an STA MLD with an AP MLD according to embodiments of the present invention.

At step 605, a beacon frame is transmitted by an AP MLD for receipt by a wireless station (STA) MLD. Step 605 can include transmitting beacon frames over multiple wireless links simultaneously. The beacon frames include a MAC address of the AP MLD, such as an MLD MAC address that uniquely identifies the AP MLD in the wireless network. The beacon frames can also include one or more WM MAC addresses associated with AP STAs of the AP MLD that communicate over the wireless network.

At step 610, a password element is generated using a preconfigured password in combination with any of the MAC addresses of the AP MLD included in the beacon frame transmitted in step 605. According to some embodiments, the AP MLD and STA MLD perform authentication over a wireless link that is different than the wireless link used to transmit the beacon frame in step 605. According to some embodiments, the AP MLD and STA MLD perform authentication over multiple wireless links in step 610.

At step 615, authentication is performed between the AP MLD and the STA MLD using the password element generated in step 610. Steps 610 and 615 can be repeated and performed without performing discovery if the corresponding device has previously been discovered and the results have been stored in a cache, for example.

Figure 7:
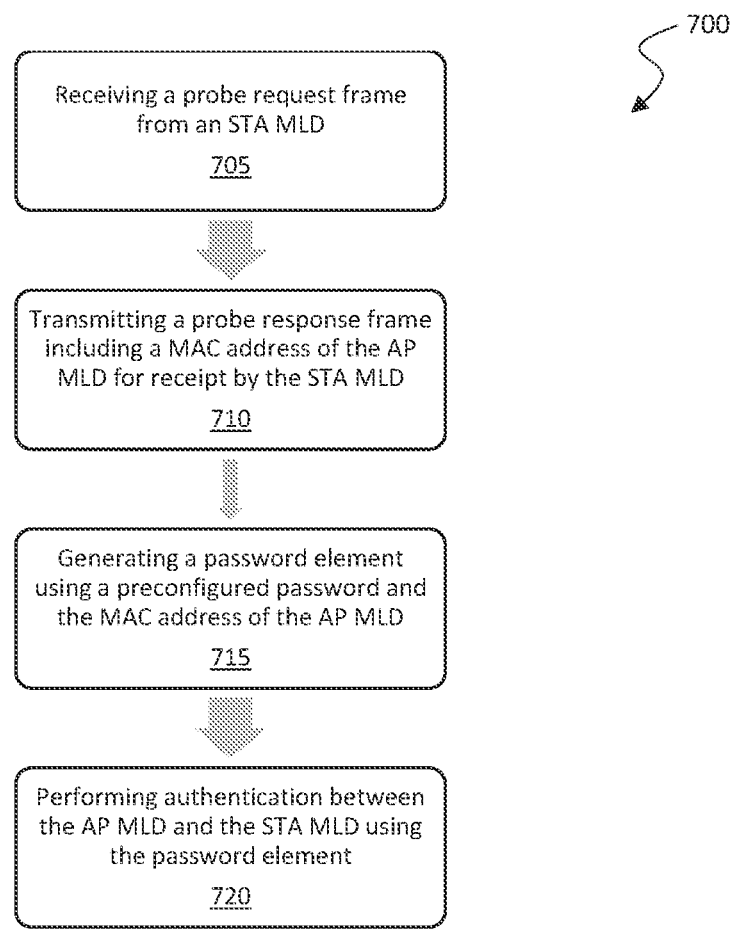
FIG. 7 is a flowchart of an exemplary computer implemented process for performing address discovery to identify and associate with an AP MLD. The AP MLD transmits a probe response frame including a MAC address of the AP MLD over one or more wireless link in a wireless network according to embodiments of the present invention.

FIG. 7 is a flowchart of an exemplary computer implemented process 700 for performing address discovery and password element generation to authenticate an AP MLD with an STA MLD according to embodiments of the present invention.

At step 705, a probe request frame is received from an STA MLD.

At step 710, a probe response frame is transmitted for receipt by the STA MLD responsive to the probe request frame received in step 705. The probe response frame includes a MAC address of the AP MLD, such as an MLD MAC address that uniquely identifies the AP MLD in the wireless network. The probe response frame can also include one or more WM MAC addresses associated with STAs of the AP MLD that communicate over the wireless network.

At step 715, a password element is generated using a preconfigured password in combination with the MAC address of the AP MLD. The password element may be generated during an authentication process between the STA MLD and the AP MLD. For example, the password element can be generated upon receipt of a commit message of an authentication sequence as depicted above in FIG. 4.

At step 720, authentication is completed between the AP MLD and the STA MLD using the password element generated in step 715. The authentication may be performed by transmitting a confirm message of an authentication sequence in response to receipt of a commit message of the same authentication sequence as depicted above in FIG. 4. Multiple authentication sequences can be performed before authentication between the AP MLD and the STA MLD is complete. According to some embodiments, the AP MLD and STA MLD perform authentication over a wireless link that is different than the wireless link used to transmit the probe response frame in step 710. According to some embodiments, the AP MLD and STA MLD perform authentication over multiple wireless links simultaneously in step 720. Steps 715 and 720 can be repeated and performed without performing discovery if the corresponding device has previously been discovered and the results have been stored in a cache, for example.

Figure 8:
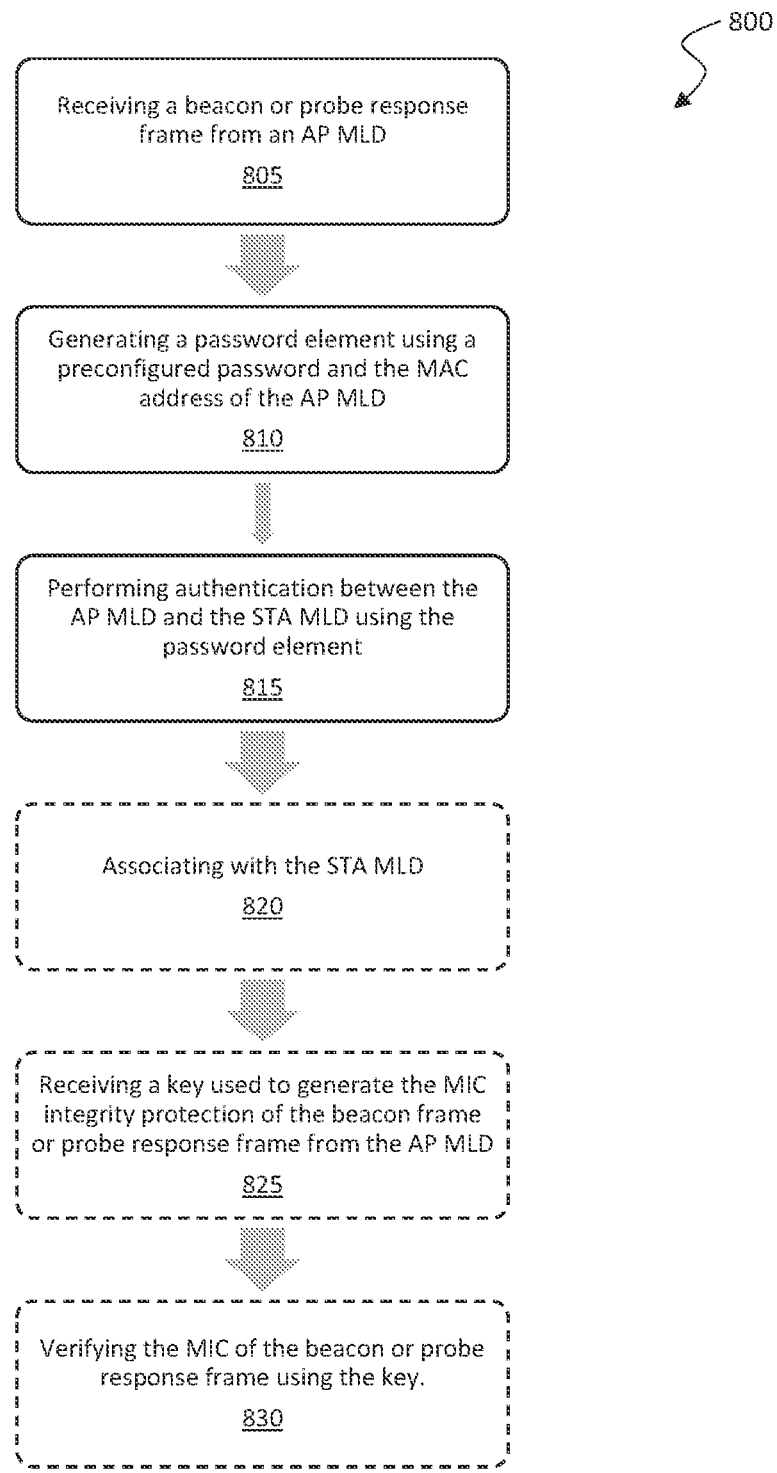
FIG. 8 is a flowchart of an exemplary computer implemented process for performing address discovery to identify and associate with an AP MLD. An STA MLD receives a beacon frame or probe response frame including a MAC address of the AP MLD over one or more wireless link in a wireless network according to embodiments of the present invention.

FIG. 8 is a flowchart of an exemplary computer implemented process 800 for performing address discovery to identify and associate with an AP MLD according to embodiments of the present invention.

At step 805, an STA MLD receives a beacon frame or a probe response frame over one or more wireless link in a wireless network. The beacon frame or probe response frame includes a MAC address of an AP MLD, such as an MLD MAC address that uniquely identifies the AP MLD in the wireless network. The beacon or probe response frame can also include one or more WM MAC addresses associated with STAs of the AP MLD that communicate over the wireless network.

At step 810, a password element is generated using a preconfigured password in combination with any of the MAC addresses of the AP MLD included in the probe response frame transmitted in step 805.

At step 815, authentication is performed between the AP MLD and the STA MLD using the password element generated in step 810. According to some embodiments, the AP MLD and STA MLD perform authentication over a different wireless link than was used to transmit the probe response frame in step 810. According to some embodiments, the AP MLD and STA MLD perform authentication over multiple wireless links in step 815.

At step 820, the STA MLD optionally associates with the AP MLD according to the authentication performed in step 815. According to some embodiments, an MIC (integrity protection) of the probe response frame can be verified by the STA MLD after associating with the AP MLD in step 820.

At step 825, the STA MLD receives a key used to generate the MIC integrity protection of the probe response frame from the AP MLD.

At step 830, the STA MLD verifies the MIC of the beacon or probe response frame using the key. If the MIC cannot be verified using the key, the STA MLD ends the association with the AP MDL.

Exemplary Computer Controlled System

Figure 9:
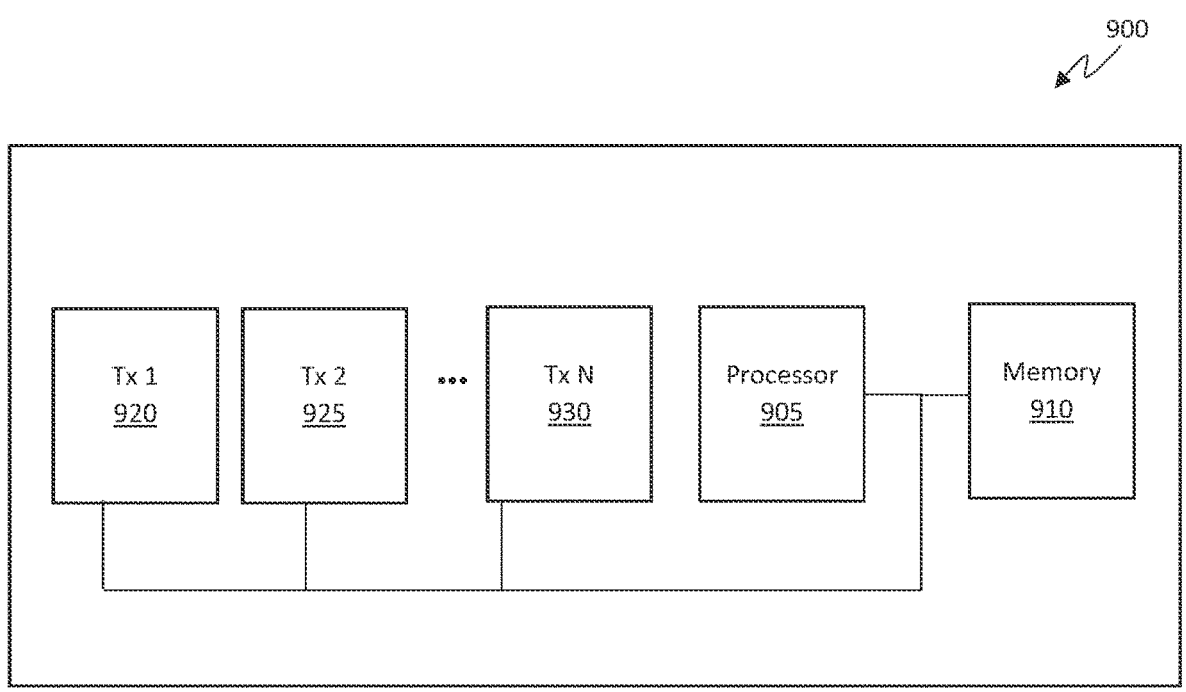
FIG. 9 is a block diagram depicting an exemplary computer system platform upon which embodiments of the present invention may be implemented.

FIG. 9 depicts an exemplary wireless device 900 upon which embodiments of the present invention can be implemented. Embodiments of the present invention are drawn to electronic systems capable of transmitting or receiving beacon frames and probe response frames that include MAC addresses of an MLD operating on multiple links in a wireless network. For example, the beacon frames and probe response frames can include an MLD MAC address that uniquely identifies an AP MLD in a wireless network, and can optionally include one or more WM MAC addresses of STAs of the AP MLD. The MAC addresses can be used to by wireless devices (e.g., STA MLDs) and can be used to generate a password element used during authentication between wireless devices to connect to and associate with the AP MLD.

The wireless device 900 includes a processor 905 for running software applications and optionally an operating system. Memory 910 can include read-only memory and/or random access memory, for example, to store applications and data for use by the processor 905 and data received or transmitted by transceivers 920, 925, and 930. The wireless device 900 can include fewer or more transceivers according to some embodiments. The transceivers 920, 925, 930 communicate with other electronic devices over a wireless network (e.g., WLAN) and typically operates according to IEEE standards (e.g., IEEE 902.11ax, IEEE 902.11ay, IEEE 902.11be, etc.).

Embodiments of the present invention are thus described. While the present invention has been described in particular embodiments, it should be appreciated that the present invention should not be construed as limited by such embodiments, but rather construed according to the following claims.

What is claimed is:

1. A method of discovering a multi-link device (MLD) on a wireless network, the method comprising:
   transmitting a beacon frame, wherein the beacon frame comprises a MAC address of an AP MLD on the wireless network, wherein the AP MLD comprises a plurality of STAs operating on a plurality of wireless links and associated with a plurality of wireless MAC addresses;
   generating a password element using a preconfigured password and the MAC address of the AP MLD; and
   performing authentication using the password element.

2. The method as described in claim 1, wherein the AP MLD comprises a first transceiver operating on a first wireless link and a second transceiver operating on a second wireless link, and wherein further the transmitting a beacon frame for receipt by a wireless station STA MLD is performed over the first wireless link, and the performing authentication between the AP MLD and the STA MLD is performed over the second wireless link.

3. The method as described in claim 1, further comprising associating the AP MLD and an STA MLD according to the authentication.

4. The method as described in claim 1, wherein the beacon frame comprises message integrity check (MIC) integrity protection, and further comprising:
   associating the AP MLD with the MAC addresses of the AP MLD; and
   subsequent to the associating, transmitting a key used to generate the MIC integrity protection for receipt by an STA MLD.

5. The method as described in claim 1, wherein the AP MLD comprises a plurality of transceivers operating on a plurality of wireless links, and further comprising transmitting a plurality of beacon frames comprising the MAC address of the AP MLD over the plurality of wireless links.

6. The method as described in claim 1, wherein the MAC address of the AP MLD is an MLD MAC address of the AP MLD that identifies the AP MLD in the wireless network.

7. The method as described in claim 1, wherein the beacon frame comprises a plurality of MAC addresses of the plurality of STAs of the AP MLD.

8. The method as described in claim 1, further comprising receiving a commit message, wherein the generating a password element is performed responsive to the commit message.

9. A method of authenticating a multi-link device (MLD) on a wireless network at an access point (AP) MLD, the method comprising:
   generating a password element using a MAC address of an AP MLD, wherein the AP MLD comprises a plurality of STAs operating on a plurality of wireless links; and
   performing authentication using the password element, wherein the AP MLD comprises a first transceiver operating on a first wireless link and a second transceiver operating on a second wireless link, and wherein the performing authentication is performed over the second wireless link.

10. The method as described in claim 9, further comprising associating the AP MLD with an STA MLD according to the authentication.

11. The method as described in claim 9, wherein the performing authentication comprises at least one of:
    an STA MLD transmitting a commit message of an authentication sequence; and
    the AP MLD transmitting a confirm message of the authentication sequence.

12. The method as described in claim 9, wherein the MAC address of the AP MLD is an MLD MAC address that uniquely identifies the AP MLD in the wireless network.

13. A wireless access point (AP) multi-link device (MLD) comprising:
    a first transceiver operating on a first wireless link;
    a second transceiver operating on a second wireless link;
    a memory for storing data; and
    a processor operable to:
    cause the first transceiver to transmit a beacon frame for receipt by a wireless station (STA) MLD, wherein the beacon frame comprises a MAC address of the wireless AP MLD on the wireless network;
    generate a password element using a preconfigured password using the MAC address of the wireless AP MLD; and
    perform authentication using the password element.

14. The wireless AP MLD as described in claim 13, wherein the processor is further operable to cause the first transceiver to transmit the beacon frame for receipt by the wireless STA MLD over the first wireless link.

15. The wireless AP MLD as described in claim 14, wherein the processor is further operable to perform authentication over the second wireless link.

16. The wireless AP MLD as described in claim 13, wherein the processor is further operable to associate the wireless STA MLD with the AP MLD according to the authentication.

17. The wireless AP MLD as described in claim 13, wherein the beacon frame comprises message integrity check (MIC) integrity protection, and wherein the processor is further operable to:
    associate the wireless AP MLD with the MAC addresses of the wireless AP MLD; and
    subsequent to the associate, transmit a key used to generate the MIC integrity protection to the STA MLD.

18. The wireless AP MLD as described in claim 13, wherein the processor is further operable to cause the second transceiver to transmit another beacon frame comprising the MAC address of the wireless AP MLD over the second wireless link.

19. The wireless AP MLD as described in claim 13, wherein the MAC address of the wireless AP MLD is an MLD MAC address of the wireless AP MLD that identifies the wireless AP MLD in the wireless network.

20. The wireless AP MLD as described in claim 13, wherein the wireless AP MLD comprises additional STAs operating on additional wireless links, and wherein the beacon frame comprises additional MAC addresses for the additional STAs of the wireless AP MLD.

* * * * *